(No Model.)

V. H. HIGGINS.
CAR WHEEL.

No. 431,143. Patented July 1, 1890.

Witnesses
W. Rossiter
C. C. Tillman

Inventor
Van H. Higgins
By H. Harrison
Atty.

UNITED STATES PATENT OFFICE.

VAN H. HIGGINS, OF CHICAGO, ILLINOIS.

CAR-WHEEL.

SPECIFICATION forming part of Letters Patent No. 431,143, dated July 1, 1890.

Application filed August 24, 1888. Serial No. 283,680. (No model.)

*To all whom it may concern:*

Be it known that I, VAN H. HIGGINS, a citizen of the United States, residing at Chicago, in the county of Cook and State of Illinois, have invented certain new and useful Improvements in Car-Wheels, of which the following is a specification, to wit.

My invention consists more especially in combining the wheel-tire with the wheel-hub by means of anti-friction rollers; also, in certain details, which will be pointed out in the claims at the end hereof.

Figure 1:
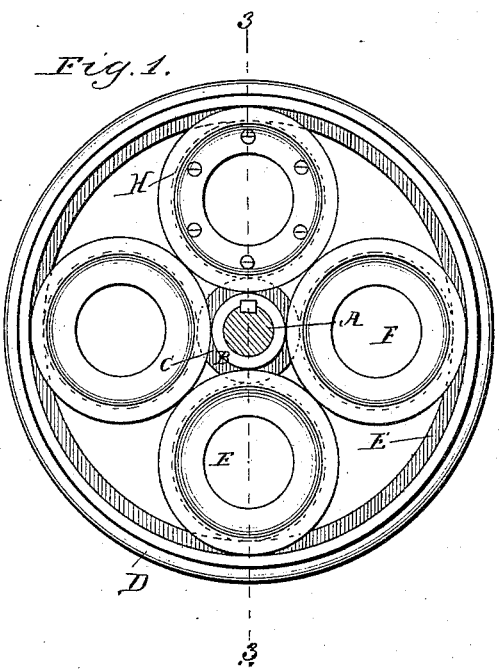
Figure 2:
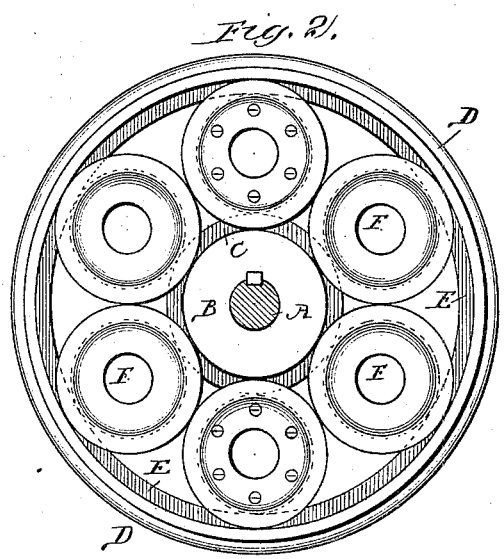
Figure 3:
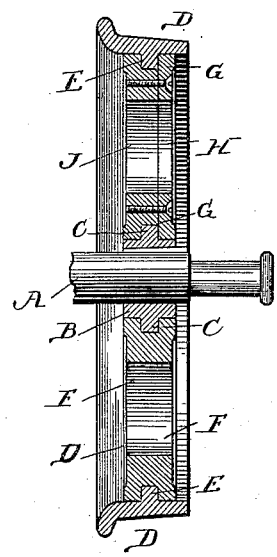

In the accompanying drawings, which represent a car-wheel constructed according to my invention, Figure 1 is an elevation or face view of a wheel with four rollers. Fig. 2 is a similar view of a wheel with six rollers, and Fig. 3 is a section through the line 3 3 of Fig. 1.

In the several figures, A is the axle of the car.

B is a hub secured on the axle in any suitable manner.

C is a flange on the hub.

D is the wheel-tire.

E is a flange on the interior thereof.

F are rollers, arranged in any desirable number between the hub and the tire. Each roller is grooved, as at G, Fig. 3, and the flanges C and E enter these grooves, so that the hub, tire, and rollers are held together.

In order that the parts may be gotten into place, I construct one or more of the rollers of two pieces H and J, (see Fig. 3,) which are brought into juxtaposition in position after the other parts of the wheel are in their positions, and are then fastened together. This construction of wheel makes the two wheels of a pair independent of each other, thereby greatly easing the motion of the car, especially in going around curves, &c.

The axle A may be secured to the car in any desirable manner, either by mounting it in journals in the usual way or otherwise.

An obvious modification of the construction shown is to groove the hub and tire and construct the rollers F with flanges entering said grooves, and the construction shown may be varied in many other ways obvious to the mechanic without departing from my invention.

Having thus fully described my invention, what I claim as new, and desire to secure by Letters Patent, is—

1. The combination of the wheel-tire, the wheel-hub, and rollers, the rollers being interposed between the tire and hub and supporting the tire, substantially as shown and described, and for the purpose set forth.

2. The combination, substantially as set forth, of the wheel-tire, the wheel-hub, the flanges on said parts, and the grooved rollers connecting said parts together.

3. The combination, substantially as set forth, of the wheel-tire, the wheel-hub, the flanges on said parts, and the grooved rollers when one of said rollers is made in sections.

4. The combination, substantially as set forth, of the wheel-tire, the wheel-hub, the flanges on said parts, the grooved rollers connecting said parts together, and an axle provided with suitable journals working in the journal-boxes of cars as now constructed, and revolving therein, whereby the end-thrust of the axle from lateral motion of the cars will be taken up by the journals in the boxes and the abrasion or cutting of the flanges will be avoided.

In testimony whereof I affix my signature in presence of two witnesses.

VAN H. HIGGINS.

Witnesses:
EUGENE C. LONG,
H. HARRISON.